US009619080B2

(12) United States Patent
Iwamoto

(10) Patent No.: US 9,619,080 B2
(45) Date of Patent: Apr. 11, 2017

(54) ELECTRONIC APPARATUS AND CONTROL METHOD OF ELECTRONIC APPARATUS

(71) Applicant: Kabushiki Kaisha Toshiba, Tokyo (JP)

(72) Inventor: Hideko Iwamoto, Nishitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/581,875

(22) Filed: Dec. 23, 2014

(65) Prior Publication Data

US 2015/0205436 A1 Jul. 23, 2015

Related U.S. Application Data

(60) Provisional application No. 61/930,865, filed on Jan. 23, 2014.

(51) Int. Cl.
*G06F 3/045* (2006.01)
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ......... G06F 3/044; G06F 3/045; G06F 3/0412
USPC ...................... 345/173–179; 178/18.01–18.04
See application file for complete search history.

(56) References Cited

U.S. PATENT DOCUMENTS

| 8,547,351 | B2* | 10/2013 | Yamauchi | G06F 3/044 |
| | | | | 178/18.01 |
| 2002/0044122 | A1* | 4/2002 | Kuwata | G09G 3/3607 |
| | | | | 345/88 |
| 2011/0210942 | A1 | 9/2011 | Kitamori et al. | |
| 2013/0197847 | A1* | 8/2013 | Tsukada | A61B 5/1473 |
| | | | | 702/104 |
| 2014/0118291 | A1* | 5/2014 | Fujii | G06F 3/0418 |
| | | | | 345/174 |
| 2015/0091810 | A1* | 4/2015 | Pan | G06F 3/0481 |
| | | | | 345/173 |

FOREIGN PATENT DOCUMENTS

| JP | 2008-281894 | 11/2008 |
| JP | 2011-198359 | 10/2011 |

* cited by examiner

*Primary Examiner* — Kimnhung Nguyen
(74) *Attorney, Agent, or Firm* — Rutan & Tucker, LLP

(57) ABSTRACT

An electronic apparatus includes a display, a touch panel, an input receiving module and a threshold value correcting module. The touch panel is configured to be superimposed on the display. The input receiving module is configured to receive an input through the touch panel. The threshold value correcting module is configured to correct a threshold value which determines whether or not a touch is input.

4 Claims, 6 Drawing Sheets

| A | A | A | A | A | A | A | A | A | A | A |
|---|---|---|---|---|---|---|---|---|---|---|
| A | A | A | A | A | A | A | A | A | A | A |
| A | B | B | B | B | B | B | B | B | A | A |
| A | B | C | C | C | C | B | B | B | A | A |
| A | B | C | D | C | C | B | B | B | A | A |
| A | B | C | D | C | C | B | B | B | A | A |
| A | B | C | C | C | C | B | B | B | A | A |
| A | B | B | B | B | B | B | B | B | A | A |
| A | A | A | A | A | A | A | A | A | A | A |
| A | A | A | A | A | A | A | A | A | A | A |

ELECTRONIC APPARATUS AND CONTROL METHOD OF ELECTRONIC APPARATUS

CROSS-REFERENCE TO RELATED APPLICATION

This application claims priority from U.S. Provisional Patent Application No. 61/930,865 filed on Jan. 23, 2014, the entire contents of which are incorporated herein by reference.

FIELD

An embodiment of the present invention relates to an electronic apparatus and a control method of the electronic apparatus.

BACKGROUND

In a tablet having a board located just below a display, a temperature difference in a casing is large due to an influence of a heat generating component such as a CPU. It is desired to ensure a stable touch performance without a deterioration of an entire sensitivity even when the temperature difference in the casing is large. In an electrostatic capacity type touch panel, a capacity variation (an electrostatic capacity) receives an influence of temperature. Thus, when a heat source such as the CPU is provided in the vicinity of the touch panel such as the tablet, a temperature in a plane is uneven. The electrostatic capacity C is proportional to an area element and inversely proportional to a distance element by setting a dielectric constant as a coefficient. The dielectric constant increases or decreases to a rise of temperature depending on a material of the touch panel.

As a related art in comparison with the above-described touch panel, there is a touch panel using a control of a FUN or the like. However, since the FUN control serves to improve an environmental temperature, the FUN control does not directly apply an influence to the electrostatic capacity of the touch panel. Thus, an anticipated improvement cannot be supposed to be achieved depending on a working condition or an orientation of the FUN.

DETAILED DESCRIPTION

According to one embodiment, an electronic apparatus includes a display, a touch panel, an input receiving module and a threshold value correcting module. The touch panel is configured to be superimposed on the display. The input receiving module is configured to receive an input through the touch panel. The threshold value correcting module is configured to correct a threshold value which determines whether or not a touch is input.

Various Embodiments will be described hereinafter with reference to the accompanying drawings.

Now, embodiments of the present invention will be described below.

First Embodiment

A first embodiment will be described below by referring to FIG. 1 to FIG. 7.

Figure 1:
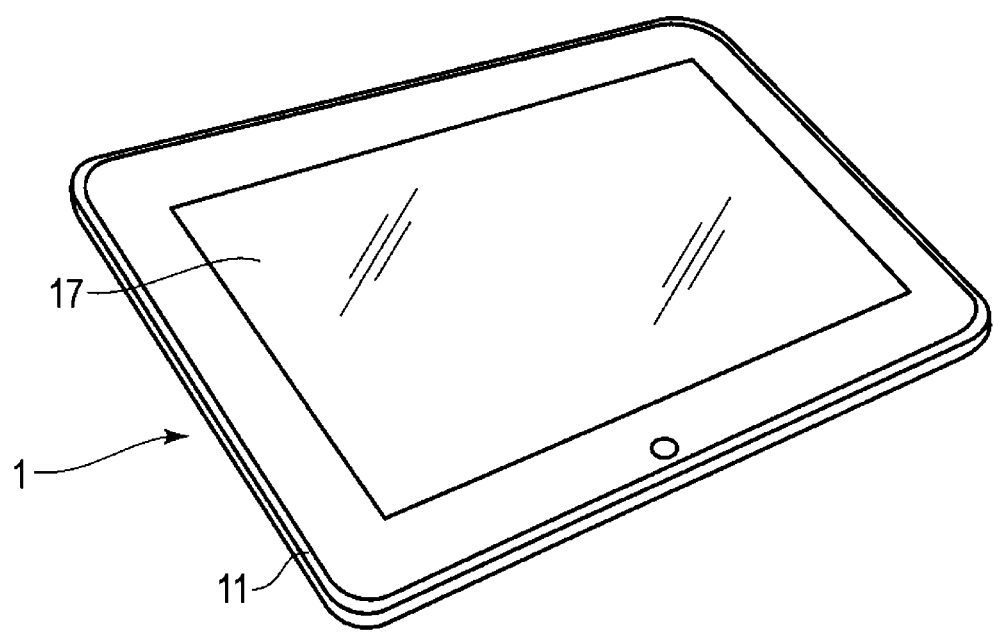
FIG. 1 is a perspective view showing an external appearance of an electronic apparatus according to an embodiment.

FIG. 1 is a perspective view showing an external appearance of an electronic apparatus according to an embodiment. The electronic apparatus is, for instance, a portable electronic apparatus. The electronic apparatus may be realized as, for instance, a tablet computer, a notebook type personal computer, a smart phone, a PDA or the like. In the following description, the electronic apparatus is supposed to be realized as a tablet type computer 1. The table type computer 1 is the portable electronic apparatus which is also referred to as a tablet or a slate computer and includes a main body 11 and a touch screen display 17 as shown in FIG. 1. The touch screen display 17 is attached so as to be overlapped on an upper surface of the main body 11.

The main body 11 has a thin box shaped casing. The touch screen display 17 incorporates therein a flat panel display and a sensor formed so as to detect a contact position of a finger on a screen of the flat panel display. The flat panel display may be, for instance, a liquid crystal display device (LCD). As the sensor, an electrostatic capacity type touch panel can be used.

The touch panel is provided so as to cover the screen of flat panel display. The touch screen display 17 can detect a touch operation to the screen by using the finger.

Figure 2:
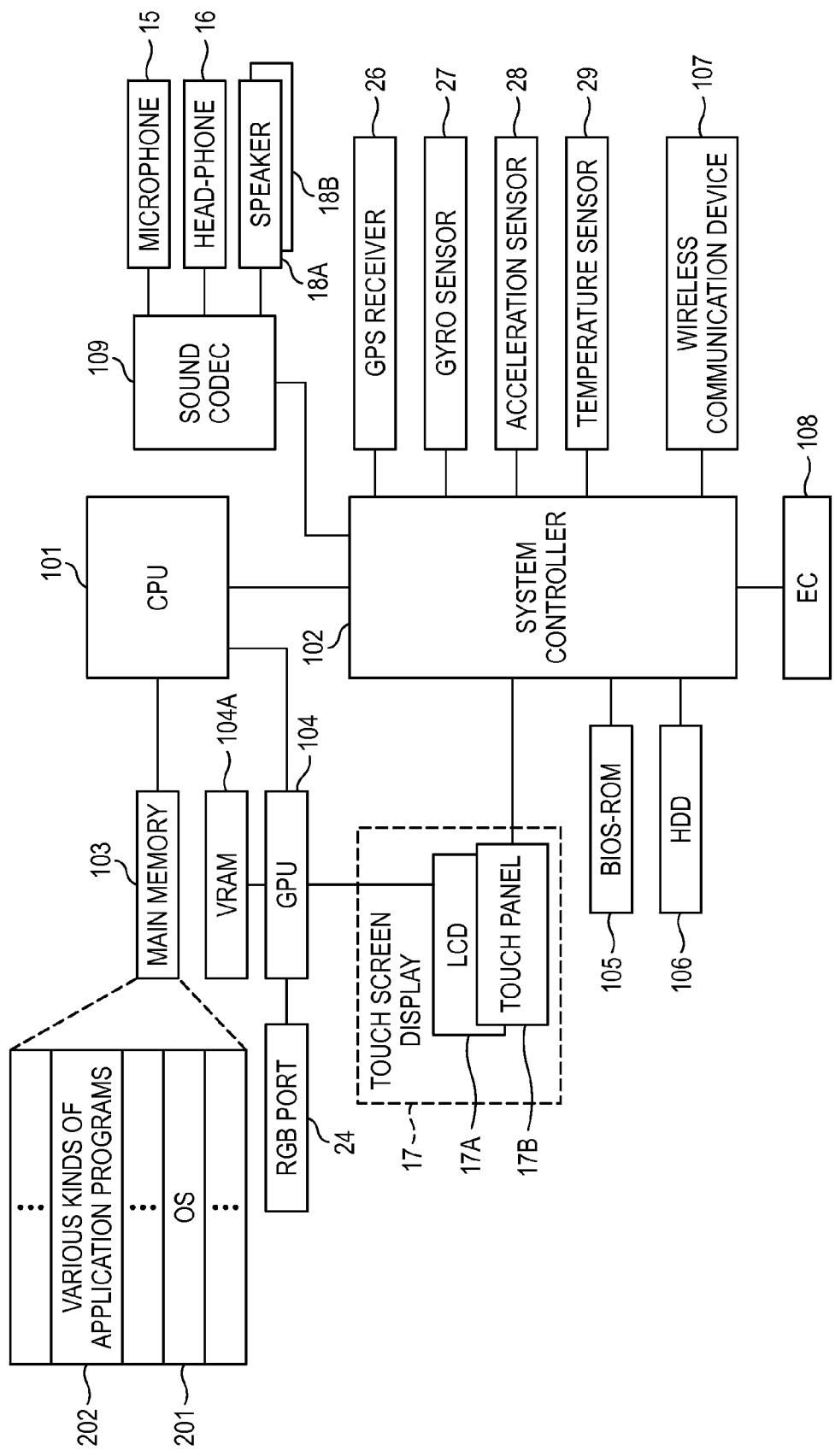
FIG. 2 is a block diagram showing a system structure of the electronic apparatus of the embodiment.

FIG. 2 shows a system structure of the computer 1.

The computer 1 includes a CPU 101, a system controller 102, a main memory 103, a graphics processing unit (GPU) 104, a BIOS-ROM 105, a hard disk drive (HDD) 106, a wireless communication device 107, an embedded controller IC (EC) 108 and a sound CODEC 109.

The CPU 101 is a processor which controls operations of components of the computer 1 respectively. The CPU 101 executes various kinds of software loaded in the main memory 103 from the HDD 106. The software includes an operating system (OS) 201 and various kinds of application programs 202.

Further, the CPU 101 also executes a basic input and output system (BIOS) stored in the BIOS-ROM 105 as a nonvolatile memory. The BIOS is a system program for controlling hardware.

The GPU 104 is a display controller which controls an LCD 17A used as a display monitor of the computer 1. The GPU 104 generates a display signal (an LVDS signal) to be supplied to the LCD 17A from display data stored in a video memory (a VRAM) 104A. Further, the GPU 104 generates an analog RGB signal and an HDMI (a registered trademark) video signal from the display data. The analog RGB signal is supplied to an external display through an RGB port 24. The GPU 104 may transmit the HDMI (the registered trademark) video signal (a non-compressed digital video signal) and a digital audio signal to the external display by one cable through an HDMI (the registered trademark) output terminal.

The system controller 102 is a bridge device which connects the CPU 101 to the components respectively. The system controller 102 incorporates therein a serial ATA controller for controlling the hard disk drive (HDD) 106. 118. Further, the system controller 102 communicates with devices respectively on an LPC (a Low PIN Count) bus.

Further, the system controller 102 is connected to a GPS receiver 26, a gyro sensor 27, an acceleration sensor 28 and a temperature sensor 29 through a serial bus such as a USB. The GPS receiver 26 is a device which receives GPS data transmitted from a plurality of GPS satellites. The GPS receiver 26 calculates a present position or height of a user by using the received GPS data. The GPS receiver (a position sensor) 26 outputs position data showing the present position of the user to the system controller 102, for instance, at intervals of prescribed time (for instance, every second).

The gyro sensor 27 detects an angular velocity. The gyro sensor 27 outputs data showing the angular velocity to the system controller 102.

The acceleration sensor 28 detects an acceleration of a movement of the user. The acceleration sensor 28 is, for instance, a three-axis acceleration sensor which detects accelerations of three axes (X, Y, Z). The acceleration sensor 28 can calculate a speed at which the user moves by using the detected acceleration. The acceleration sensor (a speed sensor) 28 outputs speed data which shows the speed at which the user moves to the system controller 102, for instance, at intervals of prescribed time (for instance, every 0.1 seconds).

The GPS receiver 26, the gyro sensor 27 and the acceleration sensor 28 may be respectively incorporated in the computer main body 11 or may be wired and connected through various kinds of terminals provided in the computer 1. Further, the GPS receiver 26, the gyro sensor 27 and the acceleration sensor 28 may be respectively wireless-connected to the computer 1 through a communication module such as a Bluetooth (a registered trademark) provided in the computer 1. The temperature sensor 29 will be described by referring to FIG. 3. The temperature sensor 29 outputs temperature data to the system controller 102.

The system controller 102 also has a function for carrying out a communication with the sound CODEC 109. The sound CODEC 109 is a sound source device and outputs audio data as an object to be reproduced to a head-phone 16 or speakers 18A and 18B. Further, the sound CODEC 109 outputs the audio data detected by a microphone 15 to the system controller 102.

The EC 108 is connected to the LPC bus. The EC 108 is realized as a one-chip microcomputer which incorporates therein an electric power management controller that carries out a management of an electric power of the computer 1. The EC 108 has a function for switching on and switching off the computer 1 in accordance with an operation of a power switch by the user.

The wireless communication device 107 is a device formed so as to carry out a wireless communication of a wireless LAN or a 3G mobile communication.

Figure 3:
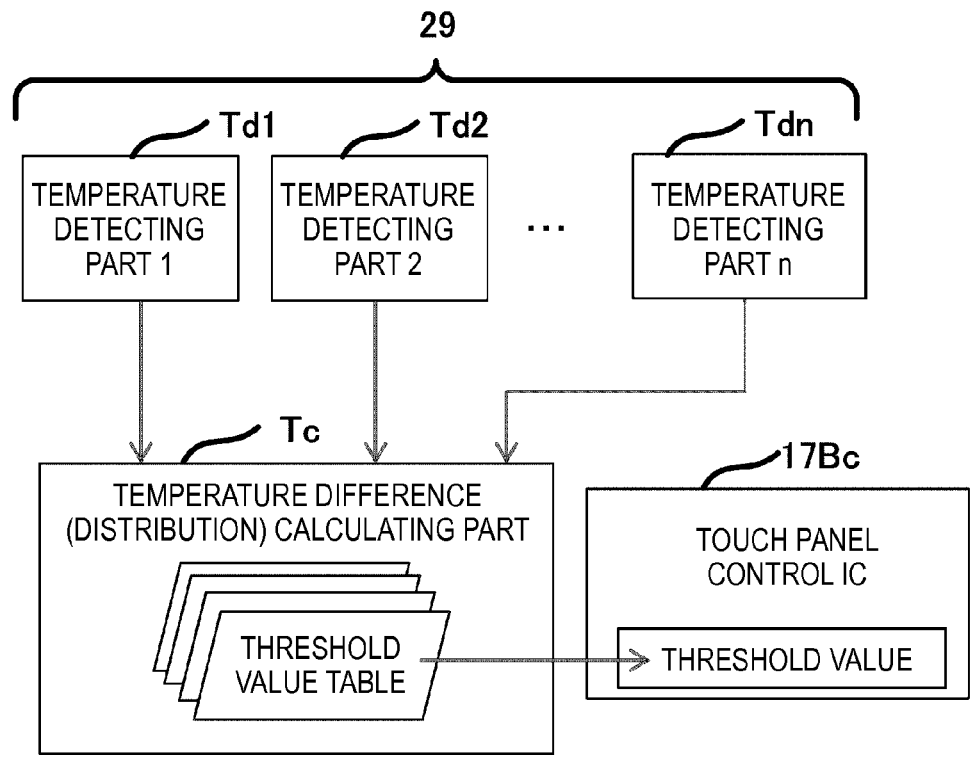
FIG. 3 is a block diagram of an information device system of the embodiment.

FIG. 3 is a block diagram of an information device system based on the structure of the computer 1 of the embodiment.

As shown in FIG. 3, the information device system includes the temperature sensor 29, a temperature difference (distribution) calculating part Tc which manages information from the sensor, calculates a temperature difference (distribution) and outputs a threshold value table and a touch panel control IC 17Bc which controls a touch panel 17B in accordance with a threshold value on the basis of the threshold value table. The touch panel control IC 17Bc does not need to be incorporated in the touch panel 17B. For instance, the temperature difference (distribution) calculating part Tc is provided as a function of the CPU 101 (or incorporated in the touch panel control IC 17Bc). The temperature sensor 29 is formed by an arrangement of temperature detectors 1 to n (Td1 to Tdn) of n sets of thermistors.

Figure 4:
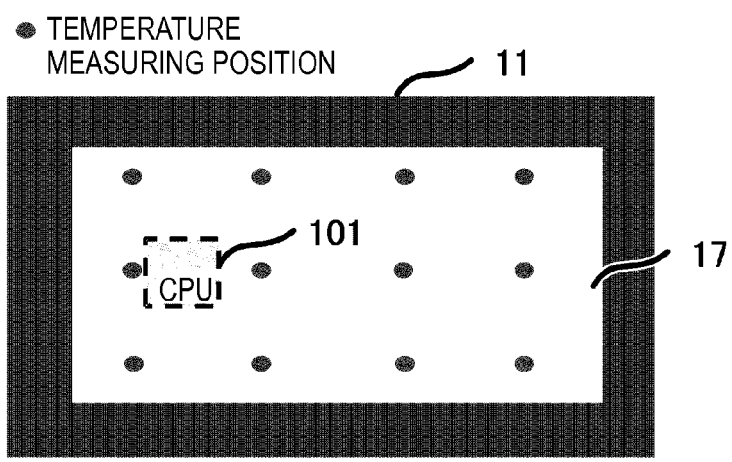
FIG. 4 is a diagram showing an example in which measuring positions of temperature detectors 1 to 12 shown by dot marks in the embodiment are formed by a range of three rows and four columns.
Figure 5:
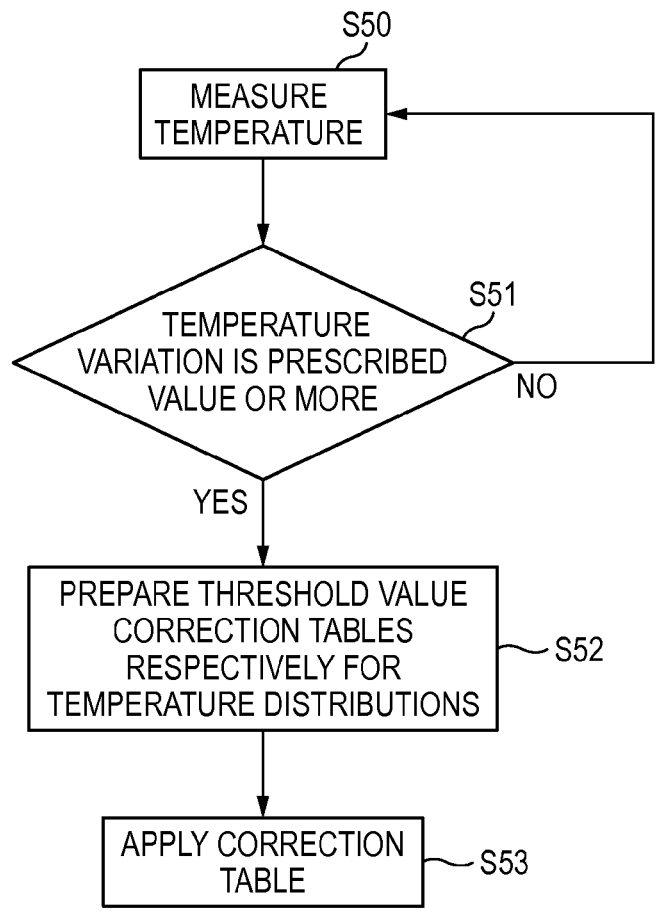
FIG. 5 is a flowchart of processes after a temperature measurement used in the embodiment.

In the present embodiment, a case will be described that temperatures of a plurality of positions are measured to estimate the temperature distribution in the plane of the touch panel. FIG. 4 shows an example in which measuring positions of the temperature detectors 1 to 12 shown by dot marks are formed by a range of three rows and four columns. FIG. 5 is a flowchart of processes after a temperature measurement.

Step S50 in FIG. 5 is started when a driver (not shown in the drawing) of the OS 201 automatically adjusts the threshold value in accordance with a temperature value obtained from the temperature sensor 29 through the system controller 102. Below-described steps of what is called a control part of an information processor are continued mainly by the OS 201.

Step 50: The driver of the OS 201 obtains a result of the temperature measurement from the temperature sensor 29 (temperatures of a plurality of temperature detecting parts 1 to n (=12) are measured to calculate the temperature differences in the temperature difference calculating part Tc).

Step S51: When the result of the temperature measurement shows that a temperature variation is a prescribed value or more, the driver of the OS 201 moves to a process of step S52. Otherwise, the driver of the OS 201 returns to the step S50.

Step S52: The driver of the OS 201 calculates the temperature distribution in the plane of the touch panel to calculate correction values separately for areas respectively in accordance with the temperature distribution.

Step S53: The driver of the OS 201 applies the threshold value tables to which the correction values are applied. Then, the processes from the step S50 may be repeated as required.

Figure 6:
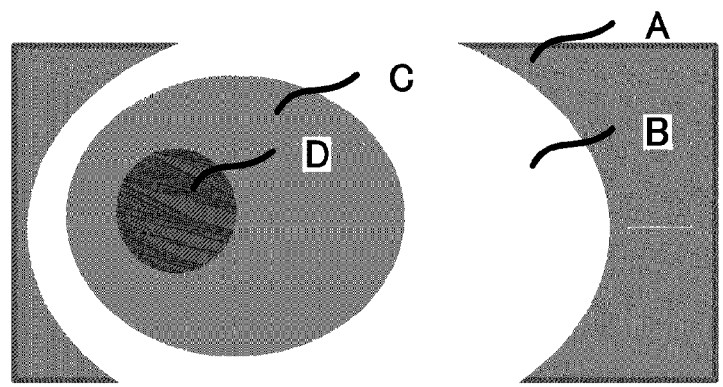
FIG. 6 is a diagram showing an example which schematically shows a result obtained by calculating a temperature distribution in a plane of a touch panel of the embodiment.

FIG. 6 shows an example which schematically illustrates the result obtained by calculating the temperature distribution in the plane of the touch panel. The temperature distribution is divided into areas A to D by mutually setting constant temperature lines as boundaries. D corresponds to a position in the vicinity of the CPU 101 in which the temperature is high. These constant temperature lines are formed by carrying out a calculation that the temperatures of the above-described twelve measuring positions are used to apply them to, for instance, elliptic curves by the least square application.

Figures 7, 8:
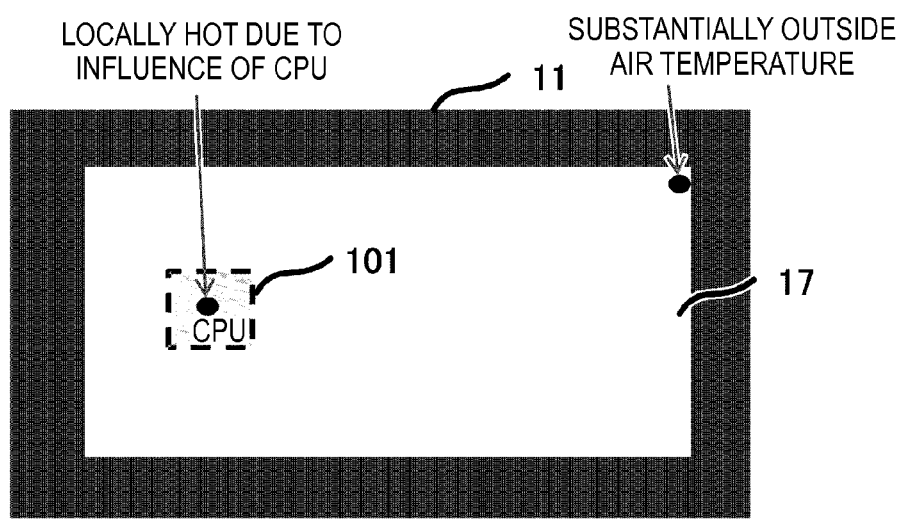
FIG. 7 is a diagram showing a threshold value table to which correction values corresponding to FIG. 6 are applied.
FIG. 8 is a block diagram showing an example which is formed by a range of measuring positions of temperature detectors 1 to 2 shown by dot marks.

FIG. 7 is a threshold value table to which the above-described correction values corresponding to FIG. 6 is applied. A to D show the threshold values corresponding to the areas A to D.

According to the above-described embodiment, a touch panel performance is provided which does not receive an influence of the temperature in a set.

Second Embodiment

Figure 9:
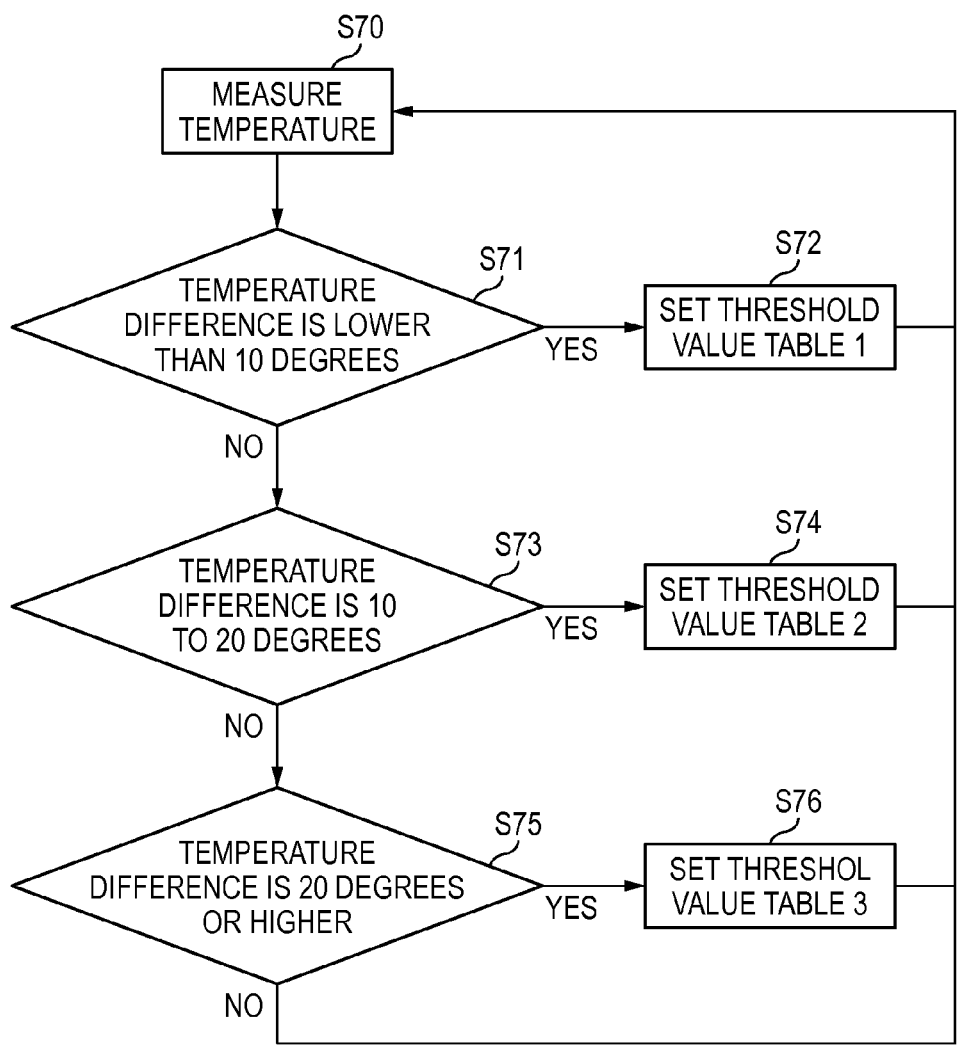
FIG. 9 is a flowchart of processes after a temperature measurement.

A second embodiment will be described by referring to FIG. 8 and FIG. 9. An explanation of parts common to those of the first embodiment is omitted. FIG. 8 shows an example which is formed by a range of measuring positions of temperature detectors 1 to 2 shown by dot marks. Namely, a case is shown that temperature of two positions is measured which include a part in the vicinity of the CPU 101 where a temperature is high and an end of a module 17 where the temperature is substantially an outside air temperature. FIG. 9 is a flowchart of processes after a temperature measurement.

Step S70 in FIG. 9 is started when the driver of the OS 201 automatically adjusts a threshold value in accordance with a temperature value obtained from the temperature sensor 29 through the system controller 102. Below-described steps of what is called a control part of an information processor are continued mainly by the OS 201. At this time, below-described two points are supposed to be beforehand prepared.

(1) A temperature difference between the two positions is divided into a plurality of stages (for instance, three stages of lower than 10 degrees, 10 to 20 degrees and higher than 20 degrees).

(2) Threshold value tables 1 to 3 are beforehand prepared respectively for the temperature differences (the larger the value is, the steeper the stage becomes).

Step 70: The driver of the OS 201 obtains a result of a temperature measurement from the temperature sensor 29 (the temperatures of the temperature detecting parts 1 and 2 are measured to calculate the temperature difference in the temperature difference calculating part).

Step S71: When the result of the temperature measurement shows that the temperature difference is lower than 10 degrees, the driver of the OS 201 moves to a process of step S72. Otherwise, the driver of the OS 201 advances to step S73.

Step S72: The driver of the OS 201 sets the threshold value table 1 and returns to the step S70.

Step S73: When the result of the temperature measurement shows that the temperature difference exceeds 10 degrees and lower than 20 degrees, the driver of the OS 201 moves to a process of step S74. Otherwise, the driver of the OS 201 advances to step S75.

Step S74: The driver of the OS 201 sets the threshold value table 2 and returns to the step S70.

Step S75: When the result of the temperature measurement shows that the temperature difference is 20 degrees or higher, the driver of the OS 201 moves to a process of step S76. Otherwise, the driver of the OS 201 returns to the step S70 (including a case that the result is not obtained due to an error).

Step S76: The driver of the OS 201 sets the threshold value table 3 and returns to the step S70.

In the second embodiment, the number of the temperature detectors is more restricted and a calculation load is more reduced than those in the first embodiment.

As problems which arise so far, circumstances may be considered that when not only an environmental temperature, but also the temperature difference (the heat generation of the CPU or the like) occurs in a set, a capacity variation changes depending on positions, so that sensitive/insensitive places are generated depending on the positions, or sensitivity needs to be lowered as a whole.

In the above-described embodiments, the threshold values of the touch panel are controlled so that a control of the FUN is not necessary and below-described features are obtained in addition thereto.

(1) A contrivance is made that "a maximum temperature difference in the set is measured, the temperature difference is divided into several stages to prepare the threshold value tables for correction so as to meet the stages respectively. Since the threshold value tables more corresponding to the temperature differences are applied, a product having a touch panel performance which meets an environment is provided without lowering an entire sensitivity".

(2) The plurality of temperatures in the set is measured to prepare the temperature distribution in the plane of the touch panel and threshold value correction coefficients are calculated respectively for the areas in accordance with the temperature distribution. The threshold values are applied respectively to the areas in accordance with the calculated correction coefficients to provide the touch panel performance which hardly depends on the temperature difference in the set.

The present invention is not limited to the above-described embodiments and may be variously modified within a range which does not deviate from a gist thereof. For instance, a deciding course naturally changes for deciding the threshold value and whether the temperature exceeds the threshold value or is lower than the threshold value depending on the increase or the decrease and its degree of a dielectric constant of a material of the touch panel relative to a rise of temperature.

Further, when a plurality of component elements disclosed in the above-described embodiments is suitably combined together, various invention can be devised. For instance, some component elements may be deleted from all the component elements disclosed in the embodiments. Further, the component elements of the different embodiments may be suitably combined together.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a display;
   a touch panel configured to be superimposed on the display;
   an input receiving module configured to receive an input through the touch panel by using an electrostatic capacity system; and
   a threshold value correcting module configured to correct a threshold value which determines whether or not a touch is input, based on temperature distributions of areas of the touch panel, in accordance with a capacity variation which changes based on a temperature.

2. The electronic apparatus according to claim 1, wherein the threshold value correcting module calculates correction values respectively for the areas in accordance with the temperature distributions to correct the threshold values.

3. The electronic apparatus according to claim 1, wherein the threshold value correcting module corrects the threshold values in accordance with threshold value tables corresponding to the temperature distributions.

4. A control method in an electronic apparatus including a display and a touch panel configured to be superimposed on the display, the control method comprising:
receiving an input through the touch panel by using an electronic capacity system; and
correcting a threshold value which determines whether or not a touch is input, based on temperature distributions of areas of the touch panel, in accordance with a capacity variation which changes based on a temperature.

* * * * *